US009553498B2

(12) United States Patent
Ahn et al.

(10) Patent No.: US 9,553,498 B2
(45) Date of Patent: Jan. 24, 2017

(54) PLANAR MOTOR AND PROCESSING APPARATUS AND USING THE SAME

(71) Applicant: Soongsil University Research Consortium Techno-Park, Seoul (KR)

(72) Inventors: Hyeong Joon Ahn, Seoul (KR); Kyoung Rock Kim, Suwon-si (KR)

(73) Assignee: SOONGSIL UNIVERSITY RESEARCH CONSORTIUM TECHNO-PARK, Seoul (KR)

( * ) Notice: Subject to any disclaimer, the term of this patent is extended or adjusted under 35 U.S.C. 154(b) by 321 days.

(21) Appl. No.: 14/193,295

(22) Filed: Feb. 28, 2014

(65) Prior Publication Data

US 2015/0022029 A1  Jan. 22, 2015

Related U.S. Application Data

(60) Provisional application No. 61/918,226, filed on Dec. 19, 2013.

(30) Foreign Application Priority Data

Jul. 16, 2013 (KR) .......................... 10-2013-0083765

(51) Int. Cl.
  *H02K 41/02*  (2006.01)
  *H02K 41/03*  (2006.01)
(52) U.S. Cl.
  CPC ............. *H02K 41/031* (2013.01); *H02K 11/21* (2016.01); *H02K 2201/18* (2013.01)
(58) Field of Classification Search
  CPC .... H02K 11/21; H02K 2201/18; H02K 41/02; H02K 41/031

USPC ........................................................ 310/12.06
See application file for complete search history.

(56) References Cited

U.S. PATENT DOCUMENTS

| 7,057,370 B2* | 6/2006 | Touzov .................. H02K 41/03 310/12.06 |
| 2003/0058427 A1* | 3/2003 | Thallner .................. G12B 5/00 355/74 |
| 2003/0132671 A1* | 7/2003 | Gweon ................... B23Q 5/28 310/12.06 |
| 2003/0141769 A1* | 7/2003 | Kubo .................. G03F 7/70758 310/12.06 |

(Continued)

FOREIGN PATENT DOCUMENTS

| JP | 05022924 A * | 1/1993 |
| JP | 2008-235470 A | 10/2008 |

(Continued)

OTHER PUBLICATIONS

Exhibition poster: "Planar Motor", iTRC Forum May 21, 2013.
Kim et al. "Core-type planar motor using planar magnet array", KSPE 2013 Spring Conference, May 29, 2013.

*Primary Examiner* — Alex W Mok
(74) *Attorney, Agent, or Firm* — Pearne & Gordon LLP (57) ABSTRACT

A planar motor includes a base provided with at least one stator, a mover provided on a top portion of a planar object to be placed on a top portion of the base, and moving according to a magnetic field generated by the stator, a mover support connected to the mover, supporting the mover from the planar object, and moving the mover according to a force of the magnetic field, and a controller supplying a control current to the stator to control location of the mover.

17 Claims, 5 Drawing Sheets

(56) References Cited

U.S. PATENT DOCUMENTS

| | | | | |
|---|---|---|---|---|
| 2005/0253463 | A1* | 11/2005 | Emoto | G03F 7/70758 310/12.06 |
| 2009/0140582 | A1* | 6/2009 | Sato | G03F 7/70758 310/12.06 |
| 2009/0251012 | A1* | 10/2009 | Tanaka | G03F 7/70758 310/12.06 |
| 2010/0156198 | A1* | 6/2010 | Cooper | G03F 7/70758 310/12.06 |
| 2012/0109355 | A1* | 5/2012 | Baccini | H01L 21/67173 700/108 |
| 2012/0328836 | A1* | 12/2012 | Binnad | G03F 7/70758 428/156 |

FOREIGN PATENT DOCUMENTS

| KR | 10-0855921 | B1 | | 9/2008 |
|---|---|---|---|---|
| KR | 20090107431 | A | * | 10/2009 |

* cited by examiner

PLANAR MOTOR AND PROCESSING APPARATUS AND USING THE SAME

CROSS-REFERENCE TO RELATED APPLICATION

This application claims the benefit of Korean Patent Application No. 10-2013-0083765 filed on Jul. 16, 2013, and U.S. Provisional Application Ser. No. 61/918,226 filed on Dec. 19, 2013, the entire disclosures of which are incorporated herein by reference.

FIELD OF THE INVENTION

The present disclosure relates to a planar motor and a processing apparatus using the same.

BACKGROUND OF THE INVENTION

Processing equipment requiring highly precise location determination ability is being used in various industrial environments. A planar motor is one of the processing equipment and being used in processing apparatuses for handling, for example, processes for manufacturing a semiconductor, processes for manufacturing various flat penal displays, and processes to various objects.

Since the planar motor does not require a separate medium for movement of a mover, it is being usually used in special work environments such as a vacuum environment.

Meanwhile, a conventional planar motor provides a mover on a top portion of a stator and moves the mover by controlling a force of a magnetic field applied to the stator. In this case, an object to be processed is placed on a top portion of the mover, and a process is carried out through processing equipment provided separately from the mover. Accordingly, the configuration of the entire system becomes complicated and large in volume.

In this regard, Korean Patent No. 10-0855921 (Title of Invention: Planar Motor and Driving Method Thereof, Stage Apparatus and Driving Method Thereof, Exposure Apparatus and Exposing Method, and Device and Manufacturing Method Thereof) obtains inductance distribution in a stator, which varies depending on a location relationship between a mover having a magnetic flux generator and the stator, by measuring inductance of each coil configuring the stator by means of an inductance measuring machine. Based on the obtained inductance distribution, a two-dimensional location and a posture of a stage member are detected. Location control of the stage member is implemented by controlling a direction or a size of a current supplied to each coil based on the detected results. As a result, the location control of the stage member can be implemented, irrespective of the location or the posture of the stage member.

BRIEF SUMMARY OF THE INVENTION

The present disclosure solves the foregoing conventional technical problem. The purpose of the present disclosure is to provide a planar motor, in which an object is positioned between a stator and a mover, and a processing apparatus using the motor.

In accordance with an aspect of illustrative embodiments, there is provided a planar motor. The planar motor includes a base provided with at least one stator; a mover provided on a top portion of a planar object to be placed on a top portion of the base, and moving according to a magnetic field generated by the stator; a mover support connected to the mover, supporting the mover from the planar object, and moving the mover according to a force of the magnetic field; and a controller supplying a control current to the stator to control location of the mover.

Further, in accordance with another aspect of the illustrative embodiments, there is provided a processing apparatus for a planar object. The processing apparatus includes a base provided with at least one stator, a mover provided on a top portion of a planar object to be placed on a top portion of the base, and moving according to a magnetic field generated by the stator, a processing unit provided on a top portion of the mover and carrying out a process to the planar object, a mover support connected to the mover, supporting the mover from the planar object, and moving the mover according to a force of the magnetic field, and a controller supplying a control current to the stator to control location of the mover.

By providing the planar motor, in which the planar object is placed between the mover and the stator, the present disclosure can reduce the complexity and the size of the equipment. Especially, the structure of the present disclosure enables processes to be easily carried out even for a planar object having a large area.

BRIEF DESCRIPTION OF THE DRAWINGS

Non-limiting and non-exhaustive embodiments of the present disclosure will be described in conjunction with the accompanying drawings. Understanding that these drawings depict only several embodiments in accordance with the disclosure and are, therefore, not to be intended to limit its scope, the disclosure will be described with specificity and detail through use of the accompanying drawings, in which.

DETAILED DESCRIPTION OF THE INVENTION

Hereinafter, illustrative embodiments of the present disclosure will be described in detail with reference to the accompanying drawings so that inventive concept may be readily implemented by those skilled in the art. However, it is to be noted that the present disclosure is not limited to the illustrative embodiments but can be realized in various other ways. In the drawings, certain parts not directly relevant to the description are omitted to enhance the clarity of the drawings, and like reference numerals denote like parts throughout the whole document.

Throughout the whole document, the terms "connected to" or "coupled to" are used to designate a connection or coupling of one element to another element and include both a case where an element is "directly connected or coupled to" another element and a case where an element is "electronically connected or coupled to" another element via still another element.

Figure 1:
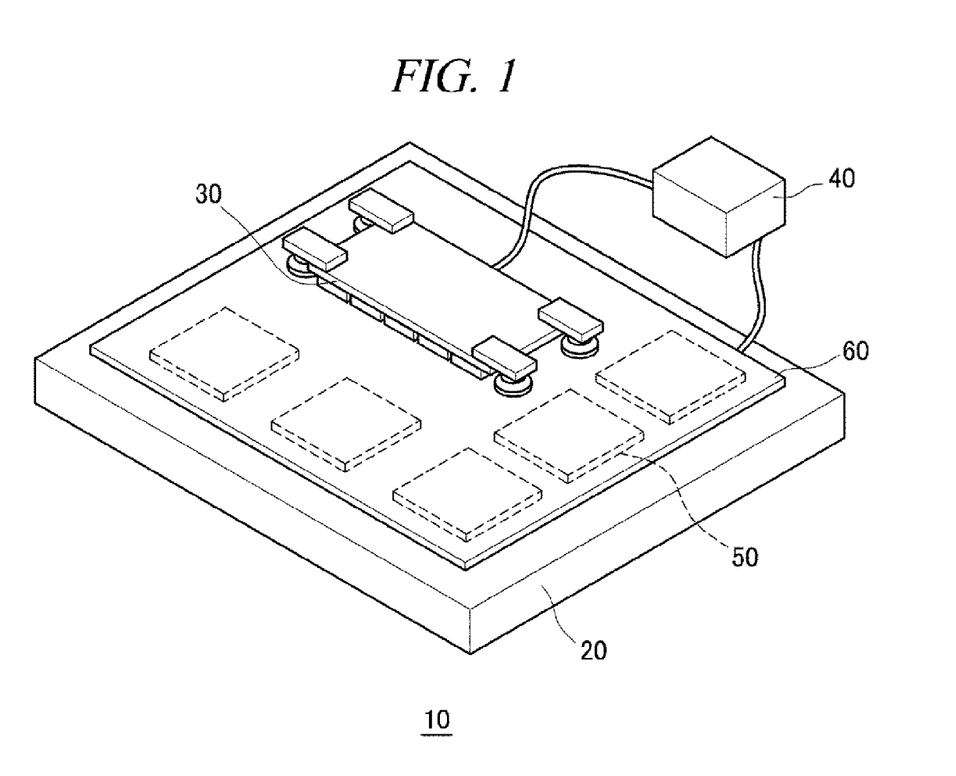
FIG. 1 illustrates a planar motor in accordance with an illustrative embodiment of the present disclosure.
Figure 2:
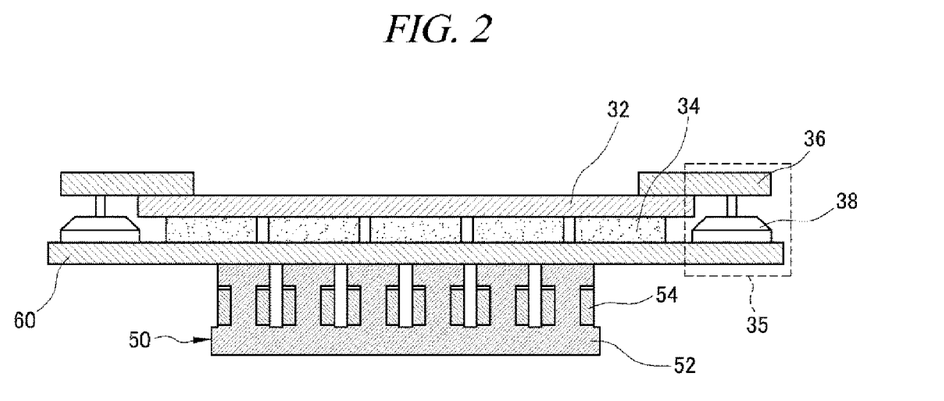
FIG. 2 illustrates a cross section of a planar motor in accordance with an illustrative embodiment of the present disclosure.

FIG. 1 illustrates a planar motor in accordance with an illustrative embodiment of the present disclosure. FIG. 2 illustrates a cross section of a planar motor in accordance with an illustrative embodiment of the present disclosure.

As illustrated, a planar motor 10 includes a base 20, a mover 30, a controller 40 and a stator 50. A planar object 60 is placed between the stator 50 and the mover 30.

At least one stator 50 is arranged on the base 20. As illustrated, a multiple number of the stators 50 may be arranged in a lattice form while being spaced from one another on the base 20 in a square plane shape. The state of a magnetic field generated by each of the stators 50 varies depending on a control current applied to each of the stators 50. As a result, magnitude of a force applied to the mover 30 may vary. For a specific method for location control of the mover 30, please refer to the descriptions in the aforementioned prior art document or other relevant prior art documents.

The stator 50 includes an iron core 52 and a coil 54 wound based on the iron core 52. A control current supplied by the controller 40 is supplied to the coil 54. Distribution of a magnetic field generated in the coil 54 can be controlled according to the control current. Meanwhile, the drawings illustrate the stators 50 having a square shape and the same size. However, the stators 50 in the drawings are merely illustrative and may be designed in different shapes and sizes.

Meanwhile, a size of the base 20, and an area of the stators 50, the number of the stators 50 or a spacing distance of the stators 50 arranged on the base 20 may be controlled in consideration of a size of the planar object to be processed. For example, the area covered by the multiple number of the stators 50 arranged in the lattice form and the area of the planar object 60 are substantially identical to each other.

The mover 30 is provided on a top portion of the planar object 60 and moves in accordance with a magnetic field generated by the stators 50. At this time, since the planar object 60 is placed on the top portion of the base 20 and the stators 50, it is placed between the base 20 and the stators 50, and the mover 30. At this time, the planar object 60 is a nonmagnetic material, which does not affect heading of the magnetic field.

The mover 30 includes a support frame 32 having a certain area, at least one magnet 34 connected to a bottom portion of the support frame 32, and a mover support 35. The area of the support frame 32 is designed to be smaller than the area of the planar object 60, such that the mover 30 can freely move on the top portion of the planar object 60. As a result of this configuration, the mover 30 can be used for planar objects 60 having various areas. Especially, the planar object 60 may be useful for applications having a large area.

The support frame 32 may be provided with various engagement members (not illustrated) for engagement with a processing unit 70, which will be described later. That is, the processing unit 70 can be fixed to the support frame 32 through the engagement members in various shapes.

In addition, the support frame 32 may be provided with an opening for carrying out various processes to the planar object 60. Various processes to an area below the opening can be carried out through the opening formed in the support frame 32.

For the magnet 34, a permanent magnet may be used. At least one magnet may be provided to the support frame 32.

A multiple number of the mover supports 35 are connected to an edge of the support frame 32 to enable the mover 30 to freely move on the top portion of the planar object 60. In the case where the planar motor is configured with the iron coil as in the present disclosure, the magnet attracts the iron core 52 (generating an attracting force), and thereby, increasing a frictional force between the mover 30 and the planar object 60. As a result, the mover 30 may not freely move on the planar object 60. In order to resolve this problem, the mover support 35 is provided for the free movement of the mover 30.

The mover support 35 may include a support frame extension 36 and an air bearing pad 38. At this time, a height of the air bearing pad 38 is designed in consideration of sum of a thickness of the support frame 32 and a thickness of the magnet 34. The support frame extension 36 is connected to the edge of the support frame in a direction in parallel with the support frame 32. The air bearing pad 38 is connected to the support frame extension 36 to support the mover 30 in a direction vertical to the surface of the planar object 60. The air bearing pad 38 sprays compressed air to the planar object 60 to make the mover 30 being spaced from the planar object 60, and minimize the frictional force between the mover 30 and the planar object 60. As a result, the mover 30 freely moves in accordance with the magnetic field generated by the stators 50. Meanwhile, since a traction force of the stators 50 acts as a preload of the air bearing pad 38, hardness and stability of the air bearing can greatly increase.

Meanwhile, although not illustrated in the drawings, the mover support 35 may be configured by using ball bearings such as ball casters, instead of the air bearing pad 38. Since the ball caster has a spherical shape, the contact area with the planar object 60 can be minimized. As a result, the frictional force between the mover 30 and the planar object 60 can be minimized.

The controller 40 supplies a control current to the stators 50 to control the location of the mover 30. In addition, the controller 40 may set a control current for controlling the location of the mover 30 based on location information of the mover 30.

Figure 3:
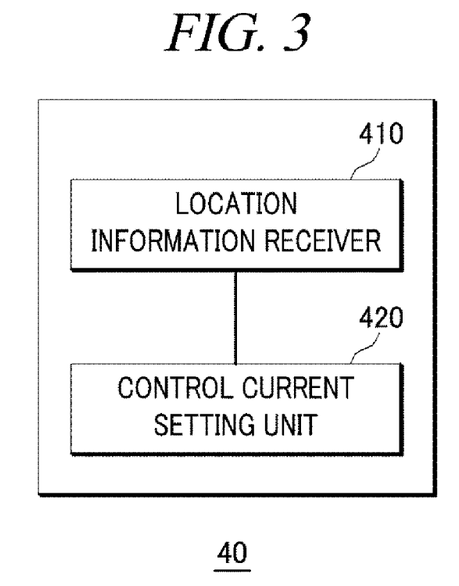
FIG. 3 illustrates detailed configuration of a controller in accordance with an illustrative embodiment of the present disclosure.

FIG. 3 is a block diagram illustrating detailed configuration of the controller in accordance with an illustrative embodiment of the present disclosure.

As illustrated, the controller 40 includes a location information receiver 410 and a control current setting unit 420. For reference, the components illustrated in FIG. 3 in accordance with an illustrative embodiment of the present disclosure may imply software or hardware such as a field programmable gate array (FPGA) or an application specific integrated circuit (ASIC), and carry out their specific functions.

However, the 'components' are not limited to the software or the hardware, and each of the components may be stored in an addressable storage medium or configured to implement one or more processors.

Accordingly, the components may include, for example, software, object-oriented software, classes, tasks, processes, functions, attributes, procedures, sub-routines, segments of program codes, drivers, firmware, micro codes, circuits, data, database, data structures, tables, arrays, variables, and others.

The components and functions thereof can be combined with one another or can be divided.

First, in order to detect the location information of the mover 30, sensors (not illustrated) may be provided in the base 20 or a structure outside the base 20. The location information receiver 410 receives the location information of the mover 30 transmitted by the sensors. For example, the sensors are equally arranged among or at the crossings of the stators 50 arranged in the lattice form, or other positions to detect the location information of the mover 30. For the sensors, a hall sensor array that measures location of the mover 30 in a magnet array or others may be used. In addition, for the sensors provided in a structure outside of the base 20, a laser displacement sensor may be used. To this end, a planar mirror, which corresponds to an object to be measured, may be provided in the mover 30.

The control current setting unit 420 sets a control current in consideration of the location information. For example, the control current setting unit 420 implements determination of whether to maintain current location of the mover 30 based on location information of the mover 30 detected at the current time, whether to move the location of the mover 30, or to which location the mover 30 needs to be moved, if the movement is necessary, in consideration of information about a sequence of processes input by a user, location for carrying out each process, and time for carrying out a process at each location. On this basis, the control current setting unit 420 sets a control current. The set control current is transferred to each of the stators 50 through the base 20. The location information of the mover 30 determined by the control current is fed back to be used for setting a control current.

Since the specific method for setting a control current is similar to a method used for a conventional planar motor, specific description of the method is omitted herein.

Figure 4:
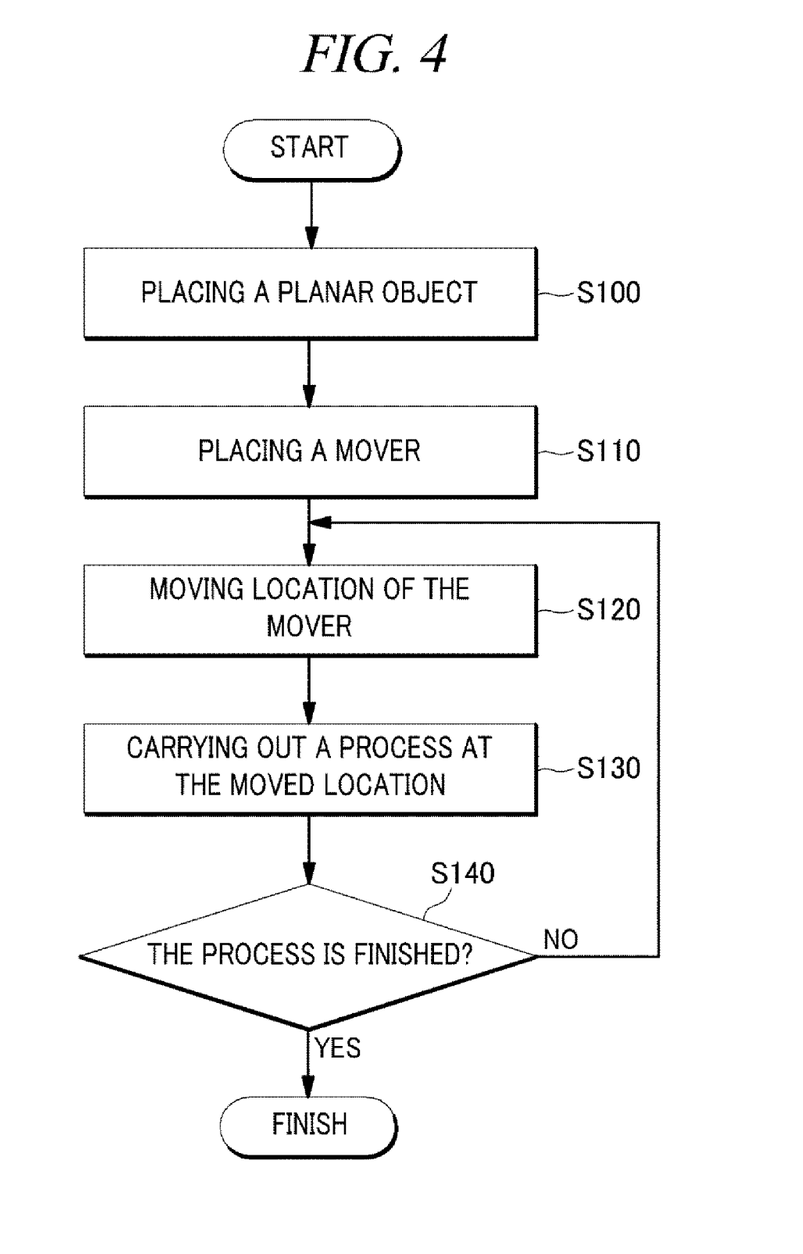
FIG. 4 illustrates a method for carrying out a process by using a planar motor in accordance with an illustrative embodiment of the present disclosure.

FIG. 4 illustrates a method for carrying out a process by using the planar motor in accordance with an illustrative embodiment of the present disclosure.

First, a planar object 60, to which a process will be carried out, is placed on the base 20 provided with the stators 50 (S100). At this time, the planar object 60 is a nonmagnetic material, which is not affected by a magnetic field.

Next, the mover 30 is placed on a top portion of the planar object 60 (S110). By adopting the structure enabling the mover 30 to freely move on the top portion of the planar object 60, a process to a planar object 60 having a large area can be more easily carried out. Meanwhile, separate processing equipment may be provided on a top portion of the mover 30.

Next, the location of the mover 30 moves by the control current applied through the controller 40 (S120). As described above, the control current is determined in consideration of the location of the mover 30 that is required at the current time depending on detailed conditions for a process, and the mover 30 moves in accordance with the control current.

Next, a predetermined process is carried out at the location, to which the mover 30 moves (S130). For example, an examination process or various surface treatment processes to the planar object are carried out. At this time, the processing unit that carries out each process may be placed on the top portion of the mover 30.

Next, whether the process is finished is determined. If the process is not finished, the mover 30 is moved to different location (S140). The controller 40 implements determination of to which location the mover 30 needs to be moved based on the location information of the mover 30 detected at the current time, in consideration of information about a sequence of processes input by a user, location for carrying out each process, and time for carrying out a process at each location. On this basis, the controller 40 sets the control current.

Figure 5:
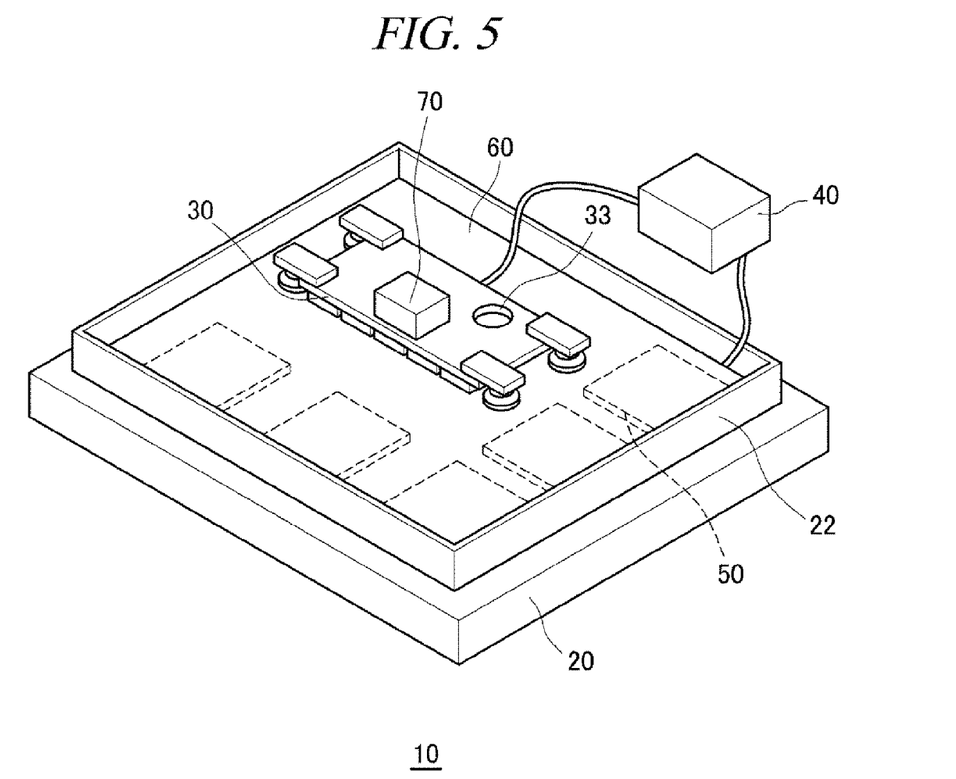
FIG. 5 illustrates a planar motor in accordance with another illustrative embodiment of the present disclosure.

FIG. 5 illustrates a planar motor in accordance with another illustrative embodiment of the present disclosure.

In the illustrated embodiment, a mover guider 22 is additionally connected to the base 20. According to the structure of the present disclosure, the mover 30 may deviate from the planar object 60 due to a control error or other causes when it moves on the top portion of the planar object 60. Especially, deviation of any one of the mover supports 35 cannot assure the free movement of the mover 30. In order to prevent the deviation, the mover guider 22 is provided in a form surrounding a periphery of the planar object 60. At this time, a height of the mover guider 22 may be the same as or greater than an entire height of the mover 30. According to circumstances, the deviation of the mover 30 can be prevented even though the height of the mover guider 22 is smaller than the height of the mover 30.

Meanwhile, the processing unit 70 may be placed on the top surface of the support frame 32 of the mover 30. The illustrated processing unit 70 is of a hexahedral shape, but is not limited thereto. The processing unit 70 may be of various shapes. For example, the processing unit 70 may carry out an examination process or various surface processes to the planar object 60. That is, the processing unit 70 may carry out a printing process, a micropattern formation process, and various measurement processes. The micropattern formation process may include various physical/chemical etching processes or various deposition processes.

In addition, the processing unit 70 may be embodied in a small stage form enabling multi-degree freedom micromotion. Accordingly, a double stage system consisting of the mover 30 and the processing unit 70 can be constructed. Meanwhile, detailed information of various processes to the planar object 60 can be input and managed through the processing unit 70. The detailed process information is transferred to the controller 40 to be considered in setting the control current. That is, the controller 40 receives, from the processing unit 70, information about a sequence of processes, location for carrying out each process, and time for carrying out a process at each location, and can set the control current based on the information.

In addition, an opening 33 may be provided in the support frame 32 to expose the planar object 60 below the support frame 32. An examination process or other surface treatment processes to the planar object 60 can be conveniently carried out through the opening 33. That is, one component of the processing unit 70 may directly approach the planar object 60 through the opening 33, or the processing unit 70 may be provided on a top portion of the opening 33, such that various processes can be carried out in a direction vertical to the planar object 60.

The opening 33 may be modified to be of various shapes, other than a circular shape, according to selection by a designer. A size or the number of the openings 33 may also be modified. In addition, a transparent member to fit in the size of the opening 33 may be provided to be used for the purpose of carrying out an examination process to the surface of the planar object 60.

The above description of the illustrative embodiments of the present disclosure is provided for the purpose of illustration, and it would be understood by those skilled in the art that various changes and modifications may be made without changing technical conception and essential features of the illustrative embodiments. Thus, it is clear that the above-described illustrative embodiments are illustrative in all aspects and do not limit the present disclosure. For example, each component described to be of a single type can be implemented in a distributed manner. Likewise, components described to be distributed can be implemented in a combined manner.

The scope of the inventive concept is defined by the following claims and their equivalents rather than by the detailed description of the illustrative embodiments. It shall be understood that all modifications and embodiments conceived from the meaning and scope of the claims and their equivalents are included in the scope of the inventive concept.

What is claimed is:

1. A planar motor comprising:
a base provided with at least one stator;
a mover provided on a top portion of a planar object to be placed on a top portion of the base, and moving according to a magnetic field generated by the stator;
a mover support connected to the mover, supporting the mover from the planar object, and moving the mover according to a force of the magnetic field;
a controller supplying a control current to the stator to control location of the mover; and
a processing unit fixed to the top portion of the mover, and carrying out a process to the planar object placed on a top portion of the base.

2. The planar motor of claim 1:
wherein the processing unit manages information of a process to be carried out to the planar object, and
the controller sets the control current with reference to the information of the process.

3. The planar motor of claim 1, further comprising:
a sensor provided in the base to detect location of the mover,
wherein the controller sets the control current based on the location of the mover.

4. The planar motor of claim 1,
wherein the stator comprises an iron core and a coil wound based on the iron core, and
a plurality of stators are arranged in a lattice form on the base.

5. The planar motor of claim 1,
wherein the mover comprises
a support frame having a certain area,
at least one magnet connected to a bottom portion of the support frame, and
a plurality of mover supports connected to an edge of the support frame.

6. The planar motor of claim 5,
wherein the support frame comprises an opening to expose the planar object.

7. The planar motor of claim 1,
wherein the planar object is a nonmagnetic material.

8. The planar motor of claim 1,
wherein the mover support comprises an air baring pad supporting the mover in a direction vertical to the surface of the object in the state that the mover is spaced from the surface of the planar object.

9. The planar motor of claim 1,
wherein the mover support comprises a ball caster supporting the mover in a direction vertical from the surface of the planar object.

10. The planar motor of claim 1,
wherein the planar object is an object to be processed by the processing unit.

11. The planar motor of claim 1,
wherein the planar object is placed between the stator and the mover.

12. A processing apparatus for a planar object, comprising:
a base provided with at least one stator,
a mover provided on a top portion of a planar object to be placed on a top portion of the base, and moving according to a magnetic field generated by the stator,
a processing unit fixed to a top portion of the mover and carrying out a process to the planar object placed on a top portion of the base,
at least one mover support connected to the mover, supporting the mover from the planar object, and moving the mover according to a force of the magnetic field, and
a controller supplying a control current to the stator to control location of the mover.

13. The processing apparatus of claim 12,
wherein the mover comprises a support frame having a certain area, and
at least one magnet connected to a bottom portion of the support frame,
wherein the mover support connected to an edge of the support frame.

14. The processing apparatus of claim 13,
wherein the support frame comprises an opening to expose the planar object.

15. The processing apparatus of claim 12,
wherein the mover support comprises an air baring pad supporting the mover in a direction vertical to the surface of the object in the state that the mover is spaced from the surface of the planar object.

16. The processing apparatus of claim 12,
wherein the mover support comprises a ball caster supporting the mover in a direction vertical from the surface of the planar object.

17. The processing apparatus of claim 12, further comprising:
a sensor provided in the base to detect location of the mover,
wherein the controller sets the control current based on the location of the mover.

* * * * *

UNITED STATES PATENT AND TRADEMARK OFFICE
CERTIFICATE OF CORRECTION

PATENT NO. : 9,553,498 B2  
APPLICATION NO. : 14/193295  
DATED : January 24, 2017  
INVENTOR(S) : Hyeong Joon Ahn et al.

Page 1 of 1

It is certified that error appears in the above-identified patent and that said Letters Patent is hereby corrected as shown below:

In the Specification

Column 4, Line 5, insert -- 24 -- after "magnet".

Signed and Sealed this
Twenty-fifth Day of July, 2017

Joseph Matal
*Performing the Functions and Duties of the*
*Under Secretary of Commerce for Intellectual Property and*
*Director of the United States Patent and Trademark Office*